United States Patent
Park et al.

(10) Patent No.: US 10,129,900 B2
(45) Date of Patent: Nov. 13, 2018

(54) WIRELESS RESOURCE SCHEDULING METHOD AND DEVICE FOR NAN

(71) Applicant: LG ELECTRONICS INC., Seoul (KR)

(72) Inventors: Giwon Park, Seoul (KR); Dongcheol Kim, Seoul (KR); Byungjoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/508,863

(22) PCT Filed: Sep. 2, 2015

(86) PCT No.: PCT/KR2015/009252
§ 371 (c)(1),
(2) Date: Mar. 3, 2017

(87) PCT Pub. No.: WO2016/036140
PCT Pub. Date: Mar. 10, 2016

(65) Prior Publication Data
US 2017/0290029 A1  Oct. 5, 2017

Related U.S. Application Data

(60) Provisional application No. 62/046,147, filed on Sep. 4, 2014.

(51) Int. Cl.
*H04W 40/24* (2009.01)
*H04W 48/16* (2009.01)
(Continued)

(52) U.S. Cl.
CPC ......... *H04W 72/12* (2013.01); *H04W 40/244* (2013.01); *H04W 48/16* (2013.01);
(Continued)

(58) Field of Classification Search
CPC ............ H04B 7/18528; H04B 7/18571; H04B 7/18576; H04B 7/18541; H04W 84/06;
(Continued)

(56) References Cited

U.S. PATENT DOCUMENTS 9,681,467 B2 * 6/2017 Yang ................. H04W 74/0816
9,699,713 B2 * 7/2017 Zhou ..................... H04W 48/16
(Continued)

FOREIGN PATENT DOCUMENTS

JP  2016506215  2/2016
JP  2016507179  3/2016
(Continued)

OTHER PUBLICATIONS

PCT International Application No. PCT/KR2015/009252, International Search Report dated Jan. 4, 2016, 2 pages.
(Continued)

*Primary Examiner* — Sharad Rampuria
(74) *Attorney, Agent, or Firm* — Lee, Hong, Degerman, Kang & Waimey PC

(57) ABSTRACT

A wireless resource scheduling method and device for NAN are disclosed. The wireless resource scheduling method for NAN can comprise the steps of: determining switching from a WiFi mode to a NAN mode by a NAN terminal of an AP function; when the NAN terminal of the AP function determines the switching to the NAN mode, transmitting a CTS-to-self frame on the WiFi mode by the NAN terminal of the AP function; switching from the WiFi mode to the NAN mode by the NAN terminal of the AP function; and transmitting, by the NAN terminal of the AP function, a NAN frame to a NAN terminal on the NAN mode, wherein the WiFi mode supports communication on the basis of a BSS and the NAN mode can support communication on the basis of a NAN cluster.

10 Claims, 13 Drawing Sheets

(51) Int. Cl.
- *H04W 72/04* (2009.01)
- *H04W 72/12* (2009.01)
- *H04W 74/00* (2009.01)
- *H04W 74/08* (2009.01)
- *H04W 84/12* (2009.01)
- *H04W 88/06* (2009.01)
- *H04W 88/08* (2009.01)

(52) U.S. Cl.
CPC ..... *H04W 72/0446* (2013.01); *H04W 74/006* (2013.01); *H04W 74/0816* (2013.01); *H04W 84/12* (2013.01); *H04W 88/06* (2013.01); *H04W 88/08* (2013.01); *Y02D 70/00* (2018.01); *Y02D 70/142* (2018.01); *Y02D 70/144* (2018.01); *Y02D 70/21* (2018.01); *Y02D 70/22* (2018.01)

(58) Field of Classification Search
CPC ............... H04W 36/00; H04W 36/005; H04W 36/0016; H04W 84/04; H04W 88/06; H04L 47/767; H04L 12/4604

See application file for complete search history.

(56) References Cited

U.S. PATENT DOCUMENTS

| | | | |
|---|---|---|---|
| 2012/0182976 | A1 | 7/2012 | Thoukydides et al. |
| 2014/0112189 | A1* | 4/2014 | Abraham ................ H04L 67/16 370/254 |
| 2014/0211674 | A1 | 7/2014 | Hiremath |
| 2014/0293992 | A1* | 10/2014 | Abraham .......... H04W 52/0225 370/350 |

FOREIGN PATENT DOCUMENTS

| | | |
|---|---|---|
| WO | 2014088378 | 6/2014 |
| WO | 2014109874 | 7/2014 |
| WO | 2014120557 | 8/2014 |
| WO | 2014123566 | 8/2014 |
| WO | 2014126606 | 8/2014 |

OTHER PUBLICATIONS

AIRMAGNET, "Impact of Legacy Devices on 802.11n Networks", Mar. 6, 2008, 15 pages.

Japan Patent Office Application No. 2017-512675, Office Action dated May 15, 2018, 2 pages.

* cited by examiner

WIRELESS RESOURCE SCHEDULING METHOD AND DEVICE FOR NAN

CROSS-REFERENCE TO RELATED APPLICATIONS

This application is the National Stage filing under 35U.S.C. 371 of International Application No. PCT/KR2015/009252, filed on Sep. 2, 2015, which claims the benefit of U.S. Provisional Application No. 62/046,147, filed on Sep. 4, 2014, the contents of which are all hereby incorporated by reference herein in their entirety.

BACKGROUND OF THE INVENTION

Field of the Invention

The present invention relates to wireless communication, and more particularly, to a radio resource scheduling method and apparatus for neighbor awareness networking (NAN).

Related Art

There is a growing demand for a proximity-based service for transmitting and receiving data between users in close proximity and application technologies based on the proximity-based service. Recently, with the explosive use of mobile Internet devices such as a smart phone, a tablet, or the like, there is a need for a device-to-device (D2D) communication technology which provides a new proximity-based service capable of guaranteeing a wider transmission range and a higher quality of service (QoS) than the conventional D2D communication technology such as Bluetooth or wireless fidelity (WiFi) peer to peer (P2P). The D2D communication technology may be utilized in various services such as commercial services, public safety related services, or the like.

WiFi Alliance (WFA) has been conducting research to support low power discovery between a plurality of terminals (or stations (STAs)) since 2011, and completed the draft specification 1.0 in May 2013. Unlike IEEE 802.11aq, the WFA supports mutual discovery between terminals without an access point (AP) in an independent basic service set (IBSS) environment of IEEE 802.11, and uses a synchronous-type protocol. Interworking with a WiFi P2P specification is taken into consideration in direct communication performed between terminals after the discovery between the terminals.

SUMMARY OF THE INVENTION

It is an object of the present invention to provide a radio resource scheduling method for neighbor awareness networking (NAN).

It is another object of the present invention to provide a radio resource scheduling apparatus for NAN.

According to an aspect of the present invention, a method of scheduling a radio resource for neighbor awareness networking (NAN) may include: determining switching from a wireless fidelity (WiFi) mode to a NAN mode by a NAN terminal in access point (AP) capability; if the NAN terminal in AP capability determines the switching to the NAN mode, transmitting, by the NAN terminal in AP capability, a clear to send (CTS)-to-self frame on the WiFi mode; switching, by the NAN terminal in AP capability, from the WiFi mode to the NAN mode; and transmitting, by the NAN terminal in AP capability, a NAN frame to the NAN terminal on the NAN mode. The WiFi mode may support communication based on a basic service set (BSS). The NAN mode may support communication based on a NAN cluster.

According to another aspect of the present invention, a NAN terminal in AP capability for performing radio resource scheduling for NAN may include: a radio frequency (RF) unit configured for transmitting or receiving a radio signal; and a processor operatively coupled to the RF unit. The processor may be configured for: determining switching from a WiFi mode to a NAN mode; if the switching to the NAN mode is determined, transmitting a CTS-to-self frame on the WiFi mode; switching from the WiFi mode to the NAN mode; and transmitting a NAN frame to the NAN terminal on the NAN mode. The WiFi mode may support communication based on a BSS. The NAN mode may support communication based on a NAN cluster.

Radio resources can be effectively allocated without waste of power to a neighbor awareness networking (NAN) terminal operating based on a NAN mode and a WiFi mode station (STA) operating based on a WiFi mode on the basis of radio resource scheduling performed by a NAN terminal in access point (AP) capability for switching between the WiFi mode and the NAN mode.

DESCRIPTION OF EXEMPLARY EMBODIMENTS

Figure 1:
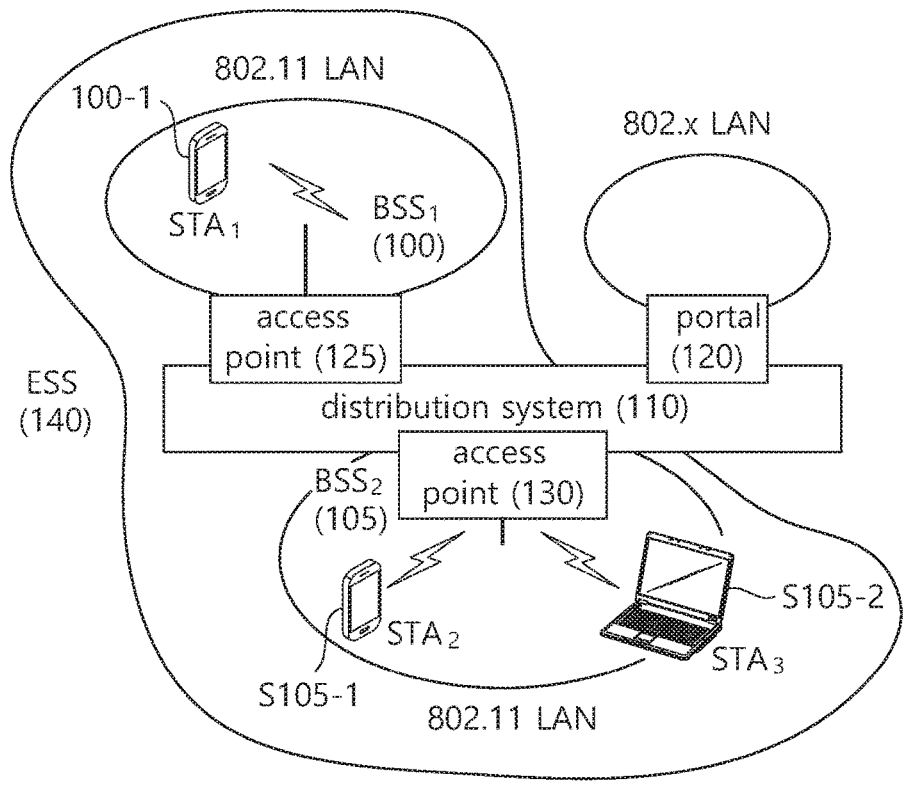
FIG. 1 is a conceptual view illustrating a structure of a wireless local area network (WLAN).
Figure 1:
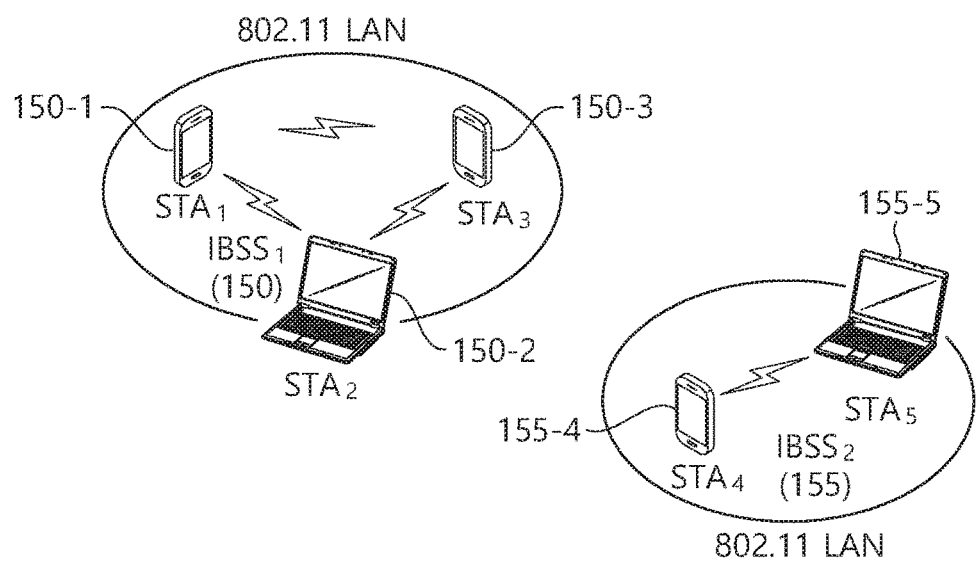

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBS S, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
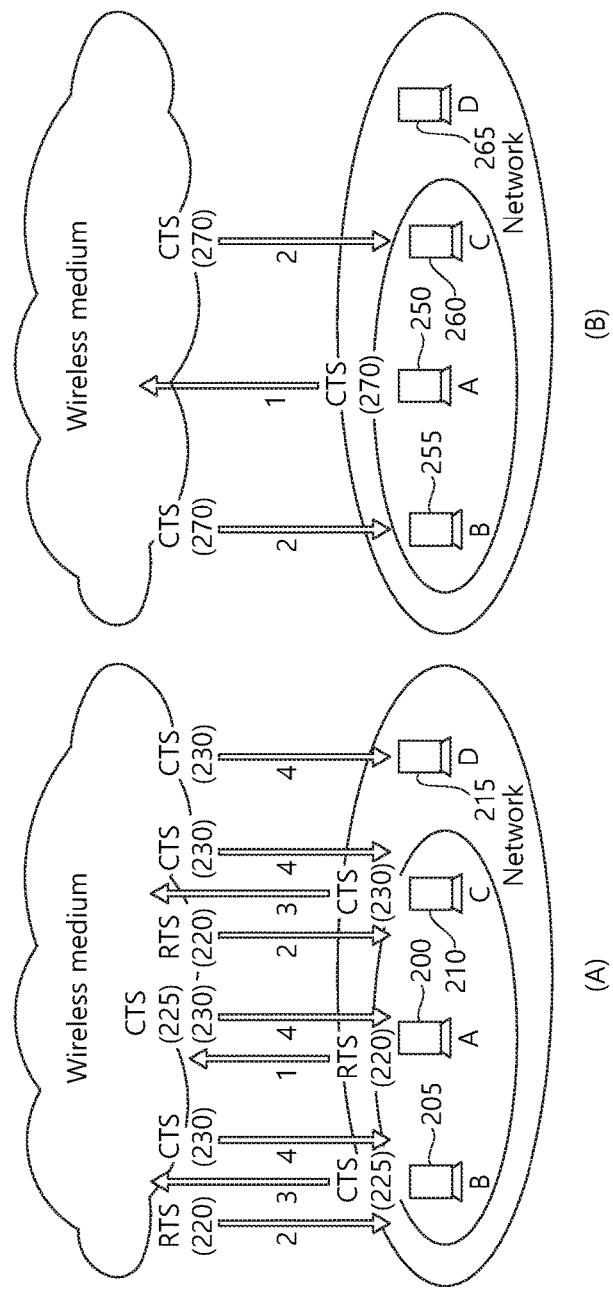
FIG. 2 is a conceptual view illustrating a clear to send (CTS)-to-self mechanism.

FIG. 2 is a conceptual view illustrating a CTS-to-self mechanism.

In FIG. 2, it is disclosed a case of sensing a medium by using a method of exchanging a request to send (RTS) frame and a clear to send (CTS) frame and a case of sensing a medium using a CTS-to-self frame.

The IEEE 802.11g standard defines a CTS-to-self protection mechanism. The CTS-to-self protection mechanism may be used in place of a medium sensing mechanism using RTS and CTS frames. In case of the CTS-to-self protection mechanism, a medium overhead can be decreased in comparison with the media sensing mechanism using the RTS/CTS frames.

Referring to the left side of FIG. 2, a method of exchanging an RTS frame and a CTS frame before transmitting a data frame at a transmitting end may be performed as follows.

A case where an STA A 200 intends to transmit a data frame to an STA C 210 is assumed in the left side of FIG. 2.

1) The STA A 200 first transmits an RTS frame 220.
2) The transmitted RTS frame 220 is transmitted to an STA B 205 and the STA C 210 which are present in a carrier sensing range.
3) The STA B 205 and the STA C 210 transmit CTS frames 225 and 230.
4) The transmitted CTS frames 225 and 230 are transmitted to the STA A 200, the STA B 205, the STA C 210, and an STA D 215.

The STA D 215 is located out of the carrier sensing range of the STA A 200, and thus cannot not receive the RTS frame 220 from the STA A 200 (That is, the STA D 215 is a hidden node of the STA A 200). However, by receiving the CTS frame 230 from the STA C 210, it can be known that the STA A 200 occupies a medium to transmit data.

5) The STA A 200 transmits a data frame to the STA C 210.

Referring to the right side of FIG. 2, a medium sensing mechanism using a CTS-to-self frame and performed before transmitting a data frame at a transmitting end may be performed as follows. A case where an STA A 250 intends to transmit a data frame to an STA C 260 is assumed in the right side of FIG. 2.

1) The STA A 250 transmits a CTS-to-self frame to an STA B 255 and the STA C 260 which are present in a carrier sensing range.
2) The STA B 255 and STA C 260 which have received the CTS-to-self frame defer transmission of another data frame to receive the data frame transmitted from the STA A 250.

A neighbor awareness technology is under research in WiFi alliance (WFA). The neighbor awareness technology can discover a service for various applications by transmitting a small amount of messages while operating in a background mode in the STA.

When using the neighbor awareness technology, the STA may discover a neighbor service before connecting to a service providing device. After the service is discovered by using neighbor awareness networking (NAN), the STA may execute an application and connect to Wi-Fi Direct or the existing WLAN network to use a corresponding service.

The NAN needs to be designed to operate smoothly in crowded environments and indoors and to minimize power consumption. After the STA exchanges information on available services with other STAs through the NAN, the STA may opt-in a connection with a discovered STA. The STA and the discovered STA may be connected through a direct connection between devices.

Hereinafter, the STA or AP communicating based on the NAN may be expressed as a NAN terminal. In particular, among the NAN terminals, a NAN terminal which creates a NAN cluster may be expressed by the term "anchor master". At least one NAN terminal among NAN terminals included in the NAN cluster may be the NAN master.

Hereinafter, a neighbor awareness networking (NAN) topology is disclosed. A NAN network may consist of NAN terminals which use a set of the same NAN parameters (e.g., a time duration between consecutive discovery windows, a duration of a discovery window, a beacon interval, a NAN channel, or the like.). The NAN terminals may constitute a NAN cluster. The NAN cluster may be a set of NAN terminals which use a set of the same NAN parameters and operate in synchronization with the same discovery window schedule.

Figure 3:
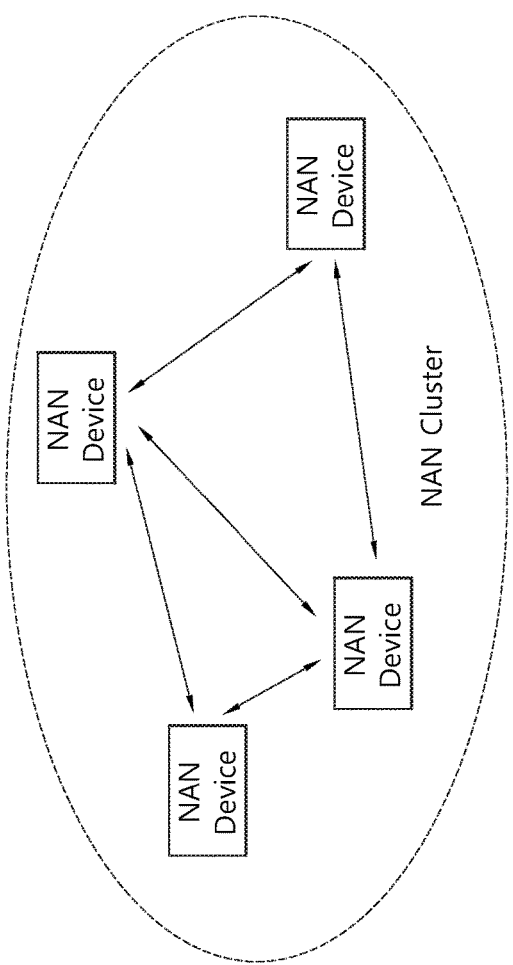
FIG. 3 and FIG. 4 are conceptual view illustrating a neighbor awareness networking (NAN) cluster.
Figure 4:
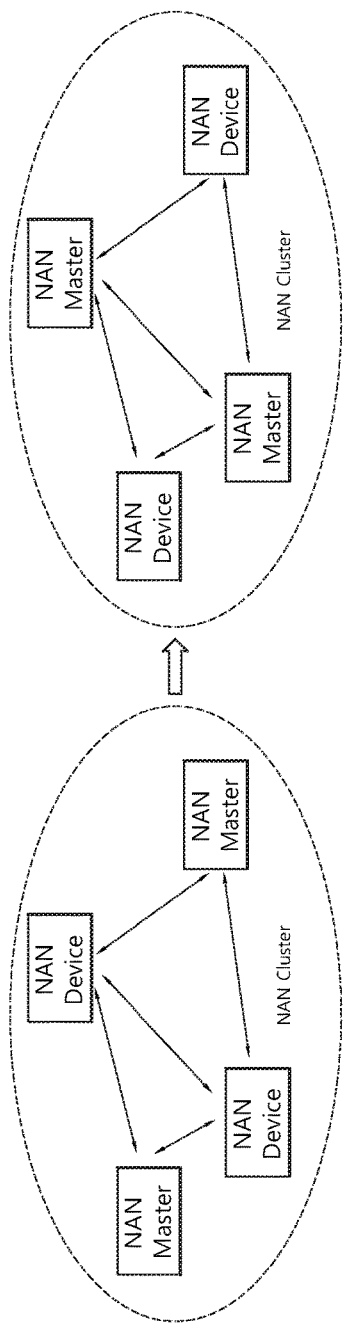

FIG. 3 and FIG. 4 are conceptual view illustrating a NAN cluster.

Referring to FIG. 3, a NAN terminal belonging to the NAN cluster may directly transmit a NAN service discovery frame in a multicast/unicast manner to another NAN terminal within a range of a discovery window.

Referring to FIG. 4, as described above, one or more NAN masters may be present in the NAN cluster, and the NAN master in the NAN cluster may be changed. In addition, the NAN master may transmit all of a NAN synchronization (or sync) beacon frame, a NAN discovery beacon frame, and a NAN service discovery frame.

The NAN sync beacon frame may be used for synchronization of NAN terminals in the NAN cluster. The NAN discovery beacon frame may be used for the purpose of advertising to NAN terminals which are not registered to the NAN cluster so that the cluster can be discovered. The NAN service discovery frame may be used for the purpose of exchanging information on a service between respective NAN terminals by advertising the service between the NAN terminals included in the NAN cluster.

Figure 5:
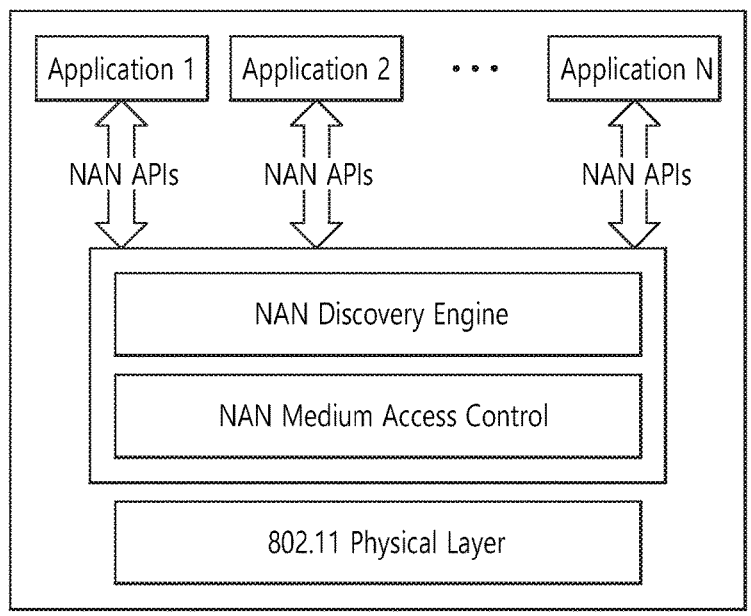
FIG. 5 is a conceptual view illustrating a structure of a NAN terminal.

FIG. 5 is a conceptual view illustrating a structure of a NAN terminal.

Referring to FIG. 5, the NAN terminal is based on the 802.11 physical layer, and has a NAN discovery engine, a NAN medium access control (MAC), and NAN application programming interfaces (APIs) towards respective applications (application 1, application 2, . . . , application N) as primary components.

Figure 6:
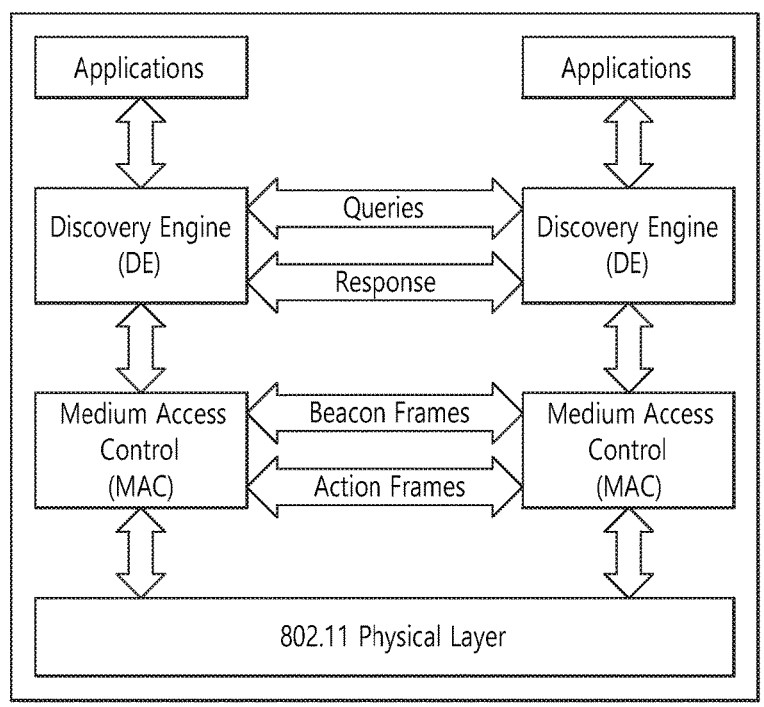
FIG. 6 and FIG. 7 are conceptual views illustrating a relationship between NAN components.
Figure 7:
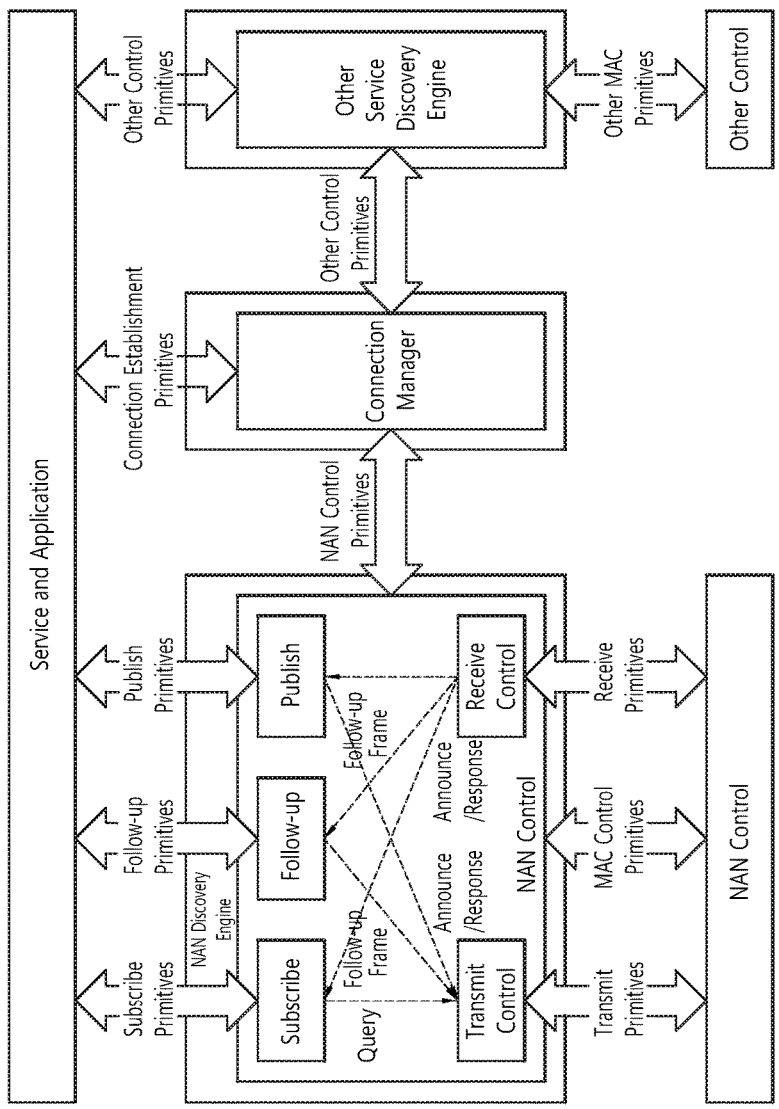

FIG. 6 and FIG. 7 are conceptual views illustrating a relationship between NAN components.

Referring to FIG. 6 and FIG. 7, a service request and response is pressed through a NAN discovery engine, and a NAN MAC processes NAN beacon frames and NAN service discovery frames. The NAN discovery engine may provide subscribe, publish, and follow-up functions.

The publish/subscribe function is performed through a service interface from a service/application. When a publish/subscribe command is executed, an instance of the publish/subscribe function is created. Each instance is driven independently, and several instances may be driven concurrently according to an implementation. The follow-up function is a means for a service/application for transmitting/receiving service-specific information.

Figure 8:
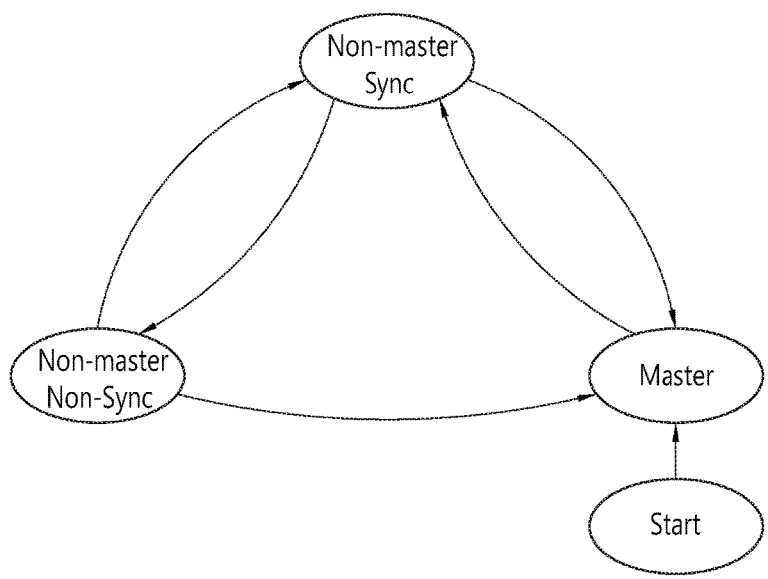
FIG. 8 is a conceptual view illustrating a role and state of a NAN terminal.

FIG. 8 is a conceptual view illustrating a role and state of a NAN terminal.

Referring to FIG. 8, the NAN terminal may operate as a NAN master for performing a master role. In addition, the role of the NAN master of the NAN terminal may be changed to another role. That is, the NAN terminal may transition to several roles and states.

The roles and states allowed for the NAN terminal may be a master (hereinafter, the master is a master role and sync state), a non-master sync, a non-master non-sync, or the like. According to the role and state of the NAN terminal, whether it is possible to transmit a NAN discovery beacon frame and/or a NAN sync beacon frame may be determined.

Table 1 below shows whether it is possible to transmit the NAN discovery beacon frame and/or the NAN sync beacon frame according to the role and state of the NAN terminal.

TABLE 1

| Role and state | NAN discovery beacon frame | NAN synchronization beacon frame |
| --- | --- | --- |
| Master | transmission is possible | transmission is possible |
| Non-Master Sync | transmission is impossible | transmission is possible |

TABLE 1-continued

| Role and state | NAN discovery beacon frame | NAN synchronization beacon frame |
| --- | --- | --- |
| Non-Master Non-Sync | transmission is impossible | transmission is impossible |

The state of the NAN terminal may be determined through a master rank. The master rank represents an intention of a NAN terminal which intends to operate as a NAN master. That is, a master rank having a great value represents a high preference for the NAN master of the NAN terminal. According to a master preference, a random factor, and a device MAC address, a NAN MR may be determined by Equation 1 described below.

$$\text{MasterRank} = \text{MasterPreference} \times 2^{56} + \text{Randomfactor} \times 2^{56} + \text{MAC}[5] \times 2^{40} + \ldots + \text{MAC}[0] \qquad \text{<Equation 1>}$$

The master preference, the random factor, and the device MAC address may be indicated based on a master indication attribute included in the NAN beacon frame. The master indication attribute may be as shown in Table 2 below.

TABLE 2

| Field Name | Size | Value | Description |
| --- | --- | --- | --- |
| Attribute ID | 1 | 0x00 | Identifies the type of NAN attribute |
| Length | 2 | 2 | Length of the following field in the attribute |
| Master Preference | 1 | 0-255 | Information that is used to indicate a NAN Device preference to serve as the role of Master, with a larger value indicating a higher preference |
| Random Factor | 1 | 0-255 | A random number selected by the sending NAN Device |

In regards to the master rank, the NAN terminal which activates the NAN service and starts the NAN cluster sets both of the master preference and the random factor to 0, and resets NANWarmUp. The NAN terminal shall set a value of the master preference in the master indication attribute to a value greater than 0 and set a value of the random factor in the master indication attribute to a new value until the NANWarmUp expires.

The NAN terminal joined to the NAN cluster having the master preference of the NAN master set to a value greater than 0 may set the master preference to a value greater than 0 regardless of whether the NANWarmUp expires, and may set the random factor to a new value.

The NAN terminal may operate as the NAN master of the NAN cluster according to the value of the master rank. That is, all NAN terminals included in the NAN cluster have capability to operate as the NAN master. The NAN master has the greatest master rank in the NAN cluster. Further, the NAN master has a value of 0 as an HC (Hop count to the Anchor Master) value. The NAN master may have the smallest AMBTT (Anchor Master Beacon Transmit Time) value among the NAN terminals included in the NAN cluster.

A plurality of NAN masters may be present temporarily in the NAN cluster. However, in principle, one NAN master may be present in the NAN cluster. A NAN terminal which becomes a NAN master in the pre-existing NAN cluster may directly use a time synchronization function (TSF) used in the pre-existing NAN cluster.

In the following case, the NAN terminal may start a new NAN cluster, or the NAN terminal may become a NAN master according to a change in the master rank. Alternatively, if a beacon frame is no longer received from another NAN terminal currently operating as the NAN master, the NAN terminal may become the NAN master. In addition, if a received signal strength indication (RSSI) of other NAN terminals among the NAN terminals belonging to the NAN cluster is decreased to be less than or equal to a specific level, the NAN terminal may autonomously become the NAN master. NAN terminals participating in the same NAN cluster may be synchronized to a common clock. The TSF of the NAN cluster may be implemented by a distributed algorithm which must be performed in all NAN terminals. Each NAN terminal participating in the NAN cluster may transmit NAN sync beacon frames according to the distributed algorithm.

The NAN terminal may synchronize a clock during a discovery window. The discovery window has a length of 16 Time Units (TUs). During the discovery window, one or more NAN terminals may transmit synchronization beacon frames to help all NAN terminals in the NAN cluster to synchronize the clock.

The NAN sync beacon frame is transmitted in a dispersive manner. The NAN sync beacon frame may be transmitted in a discovery window duration which exists every 512 TUs. All NAN terminals may participate in the creation and transmission of the NAN sync beacon frame according to the role and state of the device. Each NAN terminal shall maintain its own TSF timer used for NAN beacon cycle timing.

The transmission duration of the NAN sync beacon frame may be set by the NAN terminal which creates the NAN cluster. A series of target beacon transmission times (TBTTs) is defined such that the discovery window duration capable of transmitting the NAN sync beacon frame is separated exactly by 512 TUs. A time 0 is defined as a first TBTT, and a discovery window starts at each TBTT.

Each NAN terminal playing a role of the NAN master may transmit the NAN discovery beacon frame in a duration other than the NAN discovery window. On average, the NAN master may transmit the NAN discovery beacon frame every 100 TUs. A time between successive NAN discovery beacons transmitted by one NAN master is less than or equal to 200 TUs.

If a scheduled transmission time of the NAN discovery beacon frame overlaps with the NAN discovery window duration of the NAN cluster, the NAN master may skip transmission of the NAN discovery beacon frame. To minimize power for transmission of the NAN discovery beacon frame, the NAN master may transmit the NAN discovery beacon frame in a contention-based manner on the basis of a channel access parameter corresponding to AC (access category)_VO (voice).

In addition, the NAN terminal may transmit the NAN service discovery frame within the discovery window duration. The NAN service discovery frame may be transmitted by all NAN terminals. That is, the NAN terminal transmits a NAN service discovery frame and/or a synchronous beacon frame in a contention-based manner between a start (TStartDW) point of the discovery window and an end point (TEndDW) of the discovery window. If the NAN terminal is in a master or non-master sync state, the NAN service discovery frame and the NAN sync beacon frame may all be transmitted in the same discovery window.

Hereinafter, in an embodiment of the present invention, it is disclosed a case where a NAN device in AP capability temporarily defers (or interrupts) a service of a Wi-Fi mode in the same channel while operating in the Wi-Fi mode based on IEEE 802.11, and operates by switching to the aforementioned NAN-based NAN mode. The NAN terminal in AP capability may operate in the WiFi mode to provide an IEEE 802.11-based WiFi service on a basic service set (BSS) basis. The NAN terminal in AP capability may also operate in the NAN mode to provide the NAN-based NAN service on the basis of a NAN cluster. In other words, it can be said that the WiFi mode supports BSS-based communication, and the NAN mode supports communication based on the NAN cluster.

When the NAN terminal in AP capability operates in the NAN mode, a Wi-Fi mode based service for a Wi-Fi mode STA associated with the NAN terminal in AP capability is interrupted, and a scanning operation of the Wi-Fi mode STA for scanning the NAN terminal in AP capability may not be normally performed.

In the embodiment of the present invention, a method is disclosed in which, when the NAN terminal in AP capability is switched from the WiFi mode to the NAN mode, the NAN terminal in AP capability transmits information regarding an operation related to the NAN mode to an STA which intends to perform communication based on the WiFi mode.

Hereinafter, the STA operating in the WiFi mode is an STA operating based on IEEE 802.11, and may be expressed by the term "WiFi mode STA". In addition, hereinafter, the STA operating in the NAN mode may be expressed by the term "NAN terminal (or NAN mode STA)".

Figure 9:
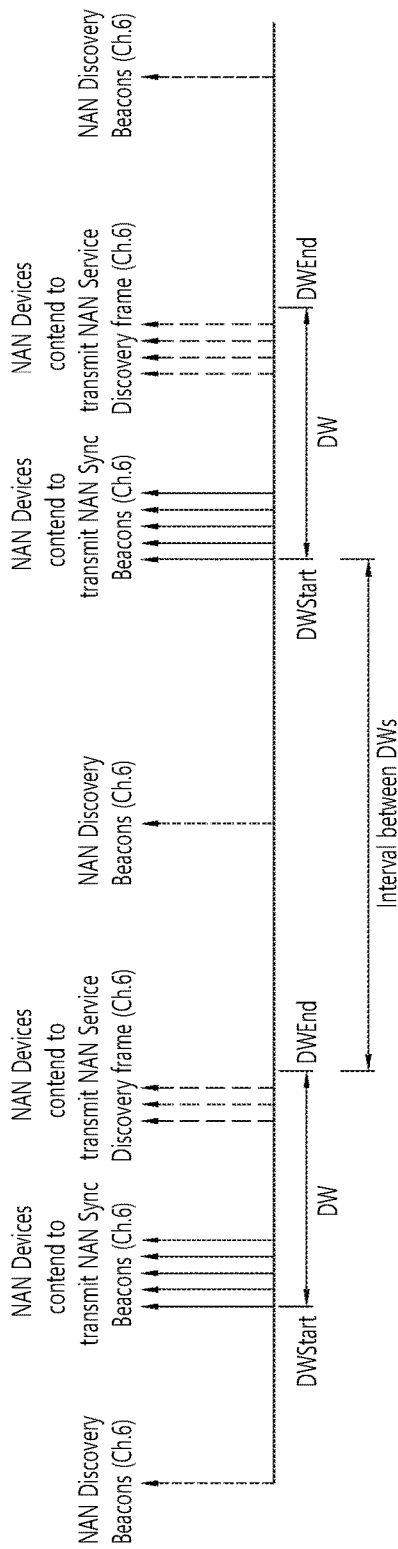
FIG. 9 is a conceptual view illustrating a NAN mode operation of a NAN terminal in access point (AP) capability.

FIG. 9 is a conceptual view illustrating a NAN mode operation of a NAN terminal in AP capability.

In FIG. 9, it is disclosed a basic operation of the NAN terminal in AP capability when the NAN terminal in AP capability operates as a NAN master.

Referring to FIG. 9, as described above, NAN terminals may periodically transmit a NAN sync beacon frame to synchronize with each other. In addition, the NAN terminals may periodically transmit a NAN service discovery frame for mutual discovery for a service to be provided. The NAN terminal in AP capability, which operates as the NAN master, may periodically transmit a NAN discovery frame. The NAN terminal in AP capability, which operates as the NAN master, may also transmit the NAN sync beacon frame and the NAN service discovery frame.

More specifically, the NAN terminal in AP capability, which is operating in a Wi-Fi mode in a channel 6, may be switched to the NAN mode for transmission of the NAN sync beacon frame, the NAN discovery beacon frame, and the NAN service discovery frame. In this case, a WiFi mode STA associated with the existing NAN terminal in AP capability, which operates in the channel 6, and a WiFi mode STA which intends to be associated with the NAN terminal in AP capability by scanning the channel 6 may perform an abnormal operation due to switching to the NAN mode of the AP. That is, when the NAN terminal in AP capability is switched to the NAN mode, the WiFi mode STA cannot perform a normal operation based on the WiFi mode, and cannot receive the WiFi-based service from the NAN terminal in AP capability. Therefore, it is necessary to inform the WiFi mode STA of the switching to the NAN mode of the NAN terminal in AP capability.

Hereinafter, in an embodiment of the present invention, it is disclosed a method in which a NAN terminal in AP capability informs a WiFi mode STA of information regarding a NAN mode operation of the NAN terminal in AP capability when the NAN terminal in AP capability is switched from a Wi-Fi mode to a NAN mode to transmit a NAN sync beacon frame, a NAN service discovery frame, and a NAN discovery beacon frame.

Figure 10:
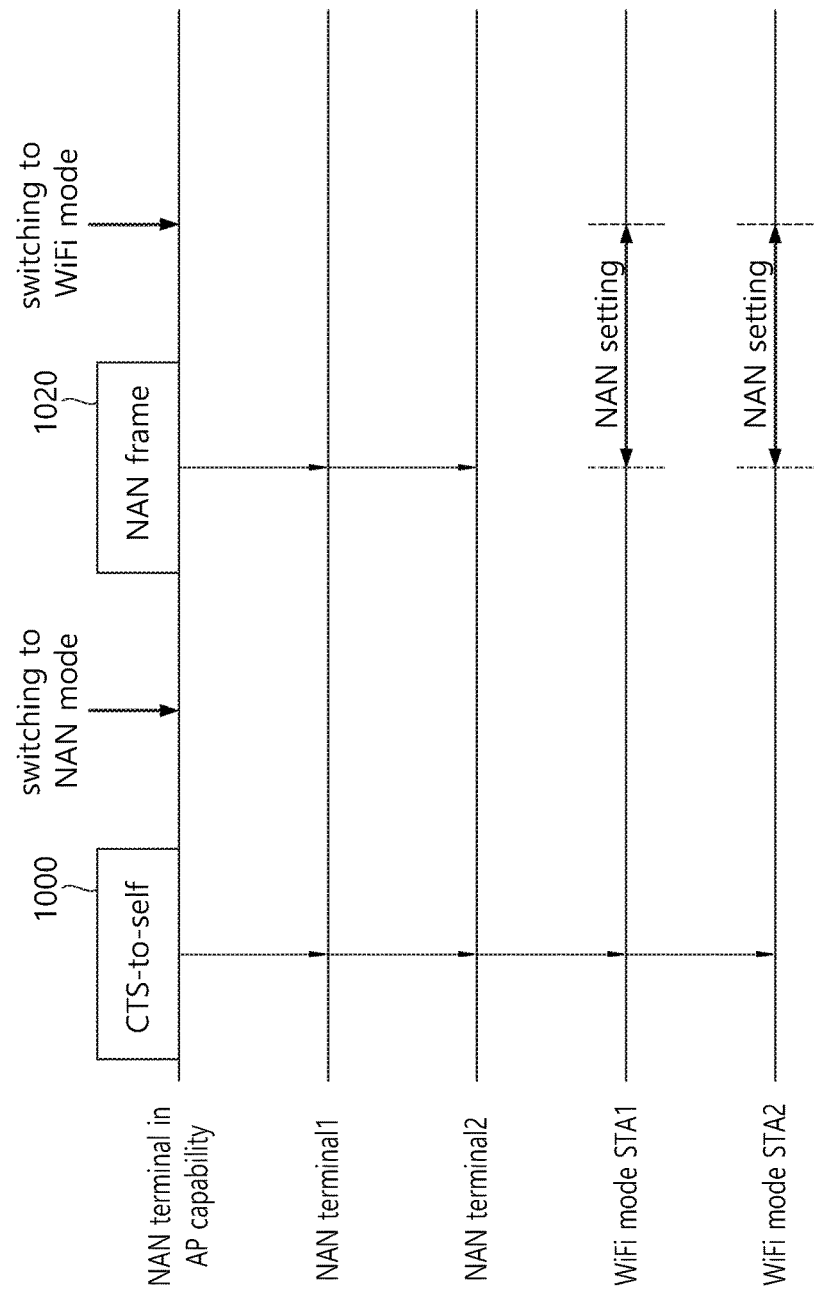
FIG. 10 is a conceptual view illustrating an operation of a NAN terminal in AP capability in a NAN mode according to an embodiment of the present invention.

FIG. 10 is a conceptual view illustrating an operation of a NAN terminal in AP capability in a NAN mode according to an embodiment of the present invention.

In FIG. 10, it is disclosed a method in which a NAN terminal in AP capability informs a WiFi mode STA of information regarding a NAN mode operation of the NAN terminal in AP capability.

Referring to FIG. 10, the NAN terminal in AP capability may transmit a CTS-to-self frame 1000 before transmitting a NAN frame 1020 (e.g., a NAN sync beacon frame, a NAN service discovery frame, or a NAN discovery frame). Hereinafter, for convenience, it is assumed in the embodiment of the present invention that the NAN terminal in AP capability uses the CTS-to-self frame 1000 to deliver information regarding the NAN mode operation of the NAN terminal in AP capability to the WiFi mode STA. However, information regarding the NAN mode operation of the NAN terminal in AP capability may be delivered to the WiFi mode STA through a frame other than the CTS-to-self frame 1000 (an existing frame or a newly defined frame (e.g., a network allocation vector (NAV) setting frame)), and such an embodiment may also be included in the scope of the present invention.

The CTS-to-self frame 1000 transmitted by the NAN terminal in AP capability may include duration information. The duration information included in the CTS-to-self frame 1000 may be used for NAV setting of the WiFi mode STA. The duration information included in the CTS-to-self frame 1000 may occasionally indicate different time durations. The NAV may be an indicator indicating a time duration during which transmission of a frame is impossible by the STA, irrespective of a result of sensing whether a medium is busy or idle on the basis of a clear channel assessment (CCA) function of the STA. If the NAV is set, transmission of the frame of the STA is impossible during the indicated time duration.

For example, the NAN terminal in AP capability may be switched to the NAN mode to transmit the CTS-to-self frame 1000 before transmitting the NAN sync beacon frame. In this case, the CTS-to-self frame 1000 may include duration information indicating a time duration in which the NAN terminal in AP capability transitions back to the WiFi mode after transitioning to the NAN mode to transmit the NAN sync beacon frame.

The NAN terminal in AP capability may be switched to the NAN mode to transmit the CTS-to-self frame 1000 before transmitting the NAN service discovery frame. In this case, the CTS-to-self frame 1000 may include duration information indicating a time duration in which the NAN terminal in AP capability transitions back to the WiFi mode after transitioning to the NAN mode to transmit the NAN service discovery frame.

The NAN terminal in AP capability may be switched to the NAN mode to transmit the CTS-to-self frame 1000 before transmitting the NAN discovery beacon frame. In this case, the CTS-to-self frame 1000 may include duration information indicating a time duration in which the NAN terminal in AP capability transitions back to the WiFi mode after transmitting the NAN discovery beacon frame by transitioning to the NAN mode.

The duration information may indicate a time duration from the transmission of the CTS-to-self frame 1000 to the switching to the WiFi mode.

Upon receiving the CTS-to-self frame 1000 transmitted by the NAN terminal in AP capability, the NAN terminal sets the NAV for a duration which is set based on the duration information included in the CTS-to-self frame 1000, and may transition to a doze state. Alternatively, the WiFi mode STA may not perform transmission of a frame while maintaining an awake state during the set duration, and thereafter may transmit a frame after the set duration.

If the NAN terminal in AP capability is switched to the NAN mode, the transmitted CTS-to-self frame 1000 may be received not only by the WiFi mode STA but also by the NAN terminal. The CTS-to-self frame 1000 is for temporary interruption of the WiFi mode of the NAN terminal in AP capability and for initiation of the NAN mode of the NAN terminal in AP capability based on the NAN mode. Therefore, when the NAN terminal receives the CTS-to-self frame 1000, the NAN terminal should not set the NAV duration on the basis of the CTS-to-self frame 1000. This is because the NAN terminal needs to receive the NAN sync beacon frame, NAN discovery beacon frame, and NAN service discovery frame transmitted by the NAN terminal in AP capability, which operates in the NAN mode. Therefore, according to the embodiment of the present invention, the duration field included in the CTS-to-self frame 1000 transmitted by the NAN terminal in AP capability may separately indicate whether to set an NAV of each of the NAN terminal and the WiFi mode STA.

Figure 11:
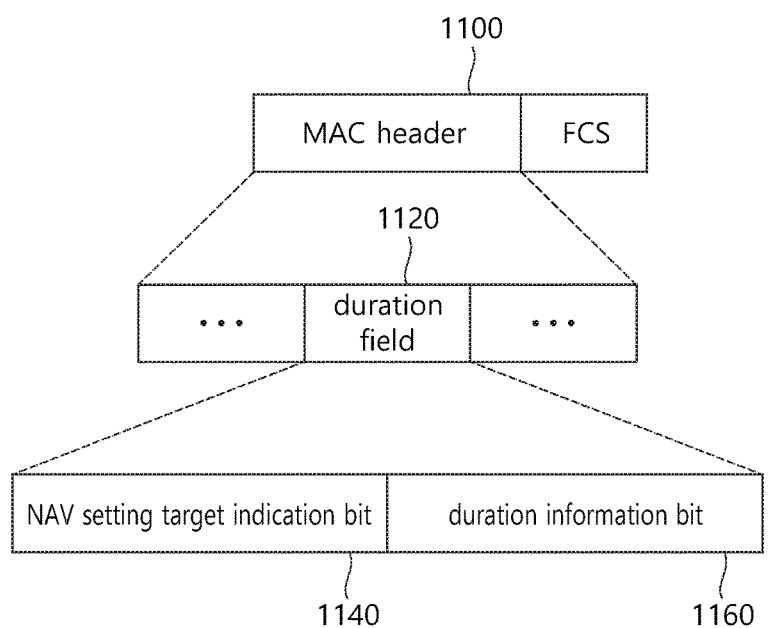
FIG. 11 is a conceptual view illustrating a CTS-to-self frame according to an embodiment of the present invention.

FIG. 11 is a conceptual view illustrating a CTS-to-self frame according to an embodiment of the present invention.

In FIG. 11, a duration field included in the CTS-to-self frame is disclosed.

Referring to FIG. 11, a medium access control (MAC) header 1100 of the CTS-to-self frame may include a duration field 1120.

According to the embodiment of the present invention, the duration field 1120 may indicate whether to set a NAV (or whether to set a NAV duration) of a NAN terminal and/or a WiFi mode STA.

For example, the duration field 1120 of the CTS-to self frame may have two octets. According to a value of a least significant bit (LSB) 1 bit or a most significant bit (MSB) 1 bit among a plurality of bits constituting the duration field 1120, both of the NAN terminal and the WiFi mode STA may set the NAV duration or only the WiFi mode STA may set the NAV duration. A bit indicating whether to set the NAV (or whether to set the NAV duration) of the NAN terminal and/or the WiFi mode STA among the bits included in the duration field 1120 may be expressed by the term "NAV setting target indication bit 1140".

For example, if a value of the NAV setting target indication bit 1140 is 0, both of the NAN terminal and the WiFi mode STA may decode the duration field to instruct to set the NAV (or the NAV duration) on the basis of the duration field. On the contrary, if the value of the NAV setting target indication bit 1140 is 1, the NAN terminal may ignore NAV setting based on the duration field and only the WiFi mode STA may instruct to perform NAV setting based on the duration.

The remaining bits (e.g., 15 bits) of the bits (e.g., 16 bits) constituting the duration field 1120, except for the NAV setting target indication bit (e.g., 1 bit) 1140, may be a duration information bit 1160 for the NAV setting.

That is, the NAN terminal may receive the CTS-to-self frame from the NAN terminal in AP capability, and may determine whether the NAV setting target indication bit 1140 included in the CTS-to-self frame is set to 1. If the NAV setting target indication bit 1140 is set to 1, the NAN terminal may receive the NAN sync beacon frame, NAN discovery beacon frame, and NAN service discovery frame transmitted by the NAN terminal in AP capability by ignoring information included in the duration field of the CTS-to self frame and by maintaining an awake state.

Figure 12:
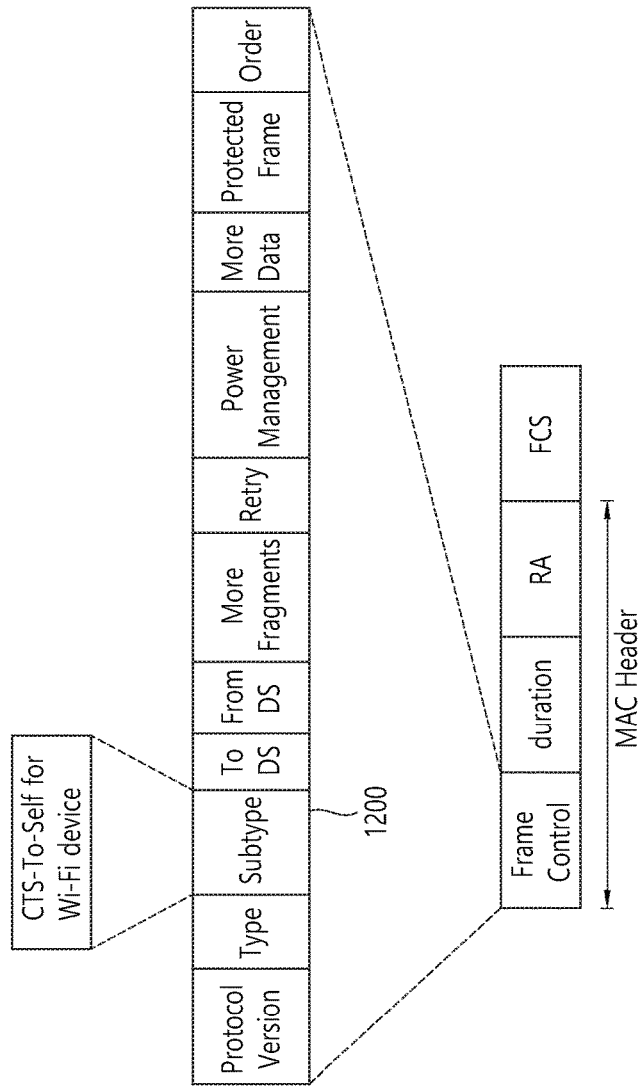
FIG. 12 is a conceptual view illustrating a CTS-to-self frame according to an embodiment of the present invention.

FIG. 12 is a conceptual view illustrating a CTS-to-self frame according to an embodiment of the present invention.

In FIG. 12, a CTS-to-self frame which is valid only for a WiFi mode STA is disclosed.

Referring to FIG. 12, a part of a reserved bit of a subtype field 1200 included in a frame control field included in a MAC header of a CTS-to-self frame may indicate whether the CTS-to-self frame is a CTS-to-self frame which is valid only for a WiFi mode STA.

Before switching to a NAN mode, a NAN terminal in AP capability may transmit in a broadcast manner the CTS-to-frame including the subtype field 1200 of the frame control field indicating that the CTS-to-self frame is valid only for the WiFi mode STA. That is, the subtype field 1200 of a specific value may indicate that the CTS-to-self frame is for the WiFi mode STA, and an AP may transmit to an STA the subtype field 1200 indicating that it is for the WiFi mode STA through the CTS-to-self frame.

In this case, the WiFi-mode STA which has received the CTS-to-self frame may set a NAN duration. The NAN terminal which has received the CTS-to-self frame may maintain an active mode, and may monitor and receive a NAN sync beacon frame, NAN discovery beacon frame, and NAN service discovery frame to be transmitted by the NAN terminal in AP capability.

Other MAC header structures are disclosed in 8.2 MAC frame formats of IEEE Standard for Information technology Telecommunications and information exchange between systems Local and metropolitan area networks Specific requirements Part 11: Wireless LAN Medium Access Control(MAC) and Physical Layer (PHY) Specifications disclosed in October 2013.

Figure 13:
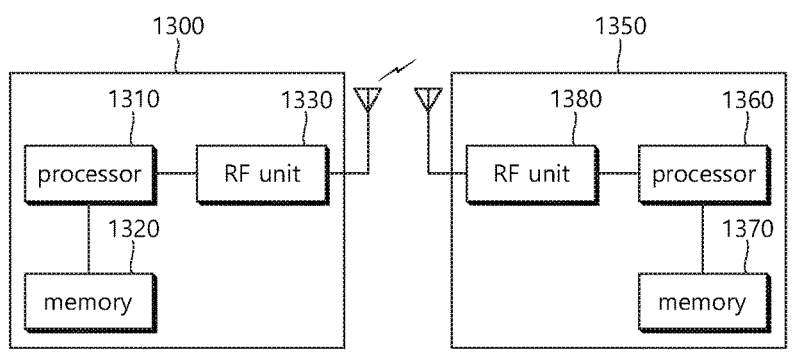
FIG. 13 is a block diagram illustrating a wireless device according to an embodiment of the present invention.

FIG. 13 is a block diagram illustrating a wireless device according to an embodiment of the present invention.

Referring to FIG. 13, an AP 1300 includes a processor 1310, a memory 1320, and a radio frequency (RF) unit 1330.

The RF unit 1330 may be coupled to the processor 1310 to transmit/receive a radio signal.

The processor 1310 may implement the functions, procedures, and/or methods proposed in the present invention. For example, the processor 1310 may be implemented to perform an operation of an AP according to the aforementioned embodiment of the present invention. The processor may perform an operation of a NAN terminal in AP capability disclosed in the embodiments of FIG. 1 to FIG. 12.

For example, the processor 1310 may be implemented to determine switching from a wireless fidelity (WiFi) mode to a NAN mode, and if the switching to the NAN mode is determined, to transmit a CTS-to-self frame on the NAN mode, switch from the WiFi mode to the NAN mode, and transmit a NAN beacon frame to a NAN terminal on the NAN mode. The WiFi mode may support communication based on a basic service set (BSS), and the NAN mode may support communication based on a NAN cluster.

The CTS-to-self frame may include a duration field, and the duration field may include information on a duration until the NAN terminal in AP capability transitions back to the switching mode. The CTS-to-self frame may be received by a WiFi mode STA operating in the WiFi mode, and the WiFi mode STA may set a network allocation vector (NAV) during the duration.

The duration field may further include a NAV setting target indication bit. If the NAV setting target indication bit indicates a first value, the NAN terminal and the WiFi mode STA may set a NAV during the duration. If the NAV setting target indication bit indicates a second value, only the WiFi STA may set the NAV during the duration.

An STA 1350 includes a processor 1360, a memory 1370, and an RF unit 1380.

The RF unit 1380 may be coupled to the processor 1360 to transmit/receive a radio signal.

The processor 1360 may implement the functions, procedures, and/or methods proposed in the present invention. For example, the processor 1360 may be implemented to perform an operation of the STA according to the aforementioned embodiment of the present invention. The processor 1360 may perform an operation of a NAN terminal (or a NAN mode STA) in the embodiments of FIG. 1 to FIG. 12.

For example, if the STA is the NAN mode STA, the processor 1360 may receive the NAN beacon frame from the NAN terminal in AP capability, which operates as a NAN master. Further, the processor 1360 may determine whether to set an NAV on the basis of the NAN setting target indication bit and duration information included in the CTS-to-self frame.

For example, if the STA is the WiFi mode STA, the processor 1360 may determine whether to set the NAV on the basis of the NAN setting target indication bit and duration information included in the CTS-to-self frame.

The processors 1310 and 1360 may include application-specific integrated circuits (ASICs), other chipsets, logical circuits, data processing devices, and/or converters for mutually converting a baseband signal and a radio signal. The memories 1320 and 1370 may include a read-only memory (ROM), a random access memory (RAM), a flash memory, a memory card, a storage medium and/or other storage devices. The RF units 1330 and 1380 may include at least one antenna to transmit and/or receive the radio signal.

When the above-described embodiment is implemented in software, the above-described scheme may be implemented using a module (procedure, function, etc.) which performs the above function. The module may be stored in the memories 1320 and 1370 may be and executed by the processors 1310 and 1360. The memories 1320 and 1370 may be disposed to the processors 1310 and 1360 internally or externally and connected to the processors 1310 and 1360 using a variety of well-known means.

What is claimed is:

1. A method of scheduling a radio resource for neighbor awareness networking (NAN), the method comprising:

determining switching from a wireless fidelity (WiFi) mode to a NAN mode by a NAN terminal in access point (AP) capability;

if the NAN terminal in AP capability determines the switching to the NAN mode, transmitting, by the NAN terminal in AP capability, a clear to send (CTS)-to-self frame on the WiFi mode;

switching, by the NAN terminal in AP capability, from the WiFi mode to the NAN mode; and transmitting, by the NAN terminal in AP capability, a NAN frame to the NAN terminal on the NAN mode, wherein the WiFi mode supports communication based on a basic service set (BSS), and wherein the NAN mode supports communication based on a NAN cluster.

2. The method of claim 1, wherein the CTS-to-self frame comprises a duration field, and wherein the duration field comprises information on a duration until the NAN terminal in AP capability transitions back to the switching mode.

3. The method of claim 2,
wherein the CTS-to-self frame is received by a WiFi mode STA operating in the WiFi mode, and
wherein the WiFi mode STA sets a network allocation vector (NAV) during the duration.

4. The method of claim 2,
wherein the duration field further comprises a NAV setting target indication bit,
wherein if the NAV setting target indication bit indicates a first value, the NAN terminal and the WiFi mode STA set a NAV during the duration, and
wherein if the NAV setting target indication bit indicates a second value, only the WiFi STA sets the NAV during the duration.

5. The method of claim 2,
wherein the NAV frame comprises a NAN sync beacon frame, a NAN discovery beacon frame, and a NAN service discovery frame,
wherein if the NAN frame is the NAN sync beacon frame, the duration is a time duration until the NAN terminal in AP capability transitions back to the switching mode after the NAN sync beacon frame is transmitted,
wherein if the NAN frame is the NAN discovery beacon frame, the duration is a time duration until the NAN terminal in AP capability transitions back to the switching mode after the NAN discovery beacon frame is transmitted, and
wherein if the NAN frame is the NAN service discovery frame, the duration is a time duration until the NAN terminal in AP capability transitions back to the switching mode after the NAN service discovery frame is transmitted.

6. A neighbor awareness networking (NAN) terminal in access point (AP) capability for performing radio resource scheduling for NAN, the NAN terminal in AP capability comprising:
a radio frequency (RF) unit configured for transmitting or receiving a radio signal; and
a processor operatively coupled to the RF unit,
wherein the processor is configured for:
determining switching from a wireless fidelity (WiFi) mode to a NAN mode;
if the switching to the NAN mode is determined, transmitting a clear to send (CTS)-to-self frame on the WiFi mode;
switching from the WiFi mode to the NAN mode; and
transmitting a NAN frame to the NAN terminal on the NAN mode,
wherein the WiFi mode supports communication based on a basic service set (BSS), and
wherein the NAN mode supports communication based on a NAN cluster.

7. The NAN terminal in AP capability of claim 6,
wherein the CTS-to-self frame comprises a duration field, and
wherein the duration field comprises information on a duration until the NAN terminal in AP capability transitions back to the switching mode.

8. The NAN terminal in AP capability of claim 7,
wherein the CTS-to-self frame is received by a WiFi mode STA operating in the WiFi mode, and
wherein the WiFi mode STA sets a network allocation vector (NAV) during the duration.

9. The NAN terminal in AP capability of claim 7,
wherein the duration field further comprises a NAV setting target indication bit,
wherein if the NAV setting target indication bit indicates a first value, the NAN terminal and the WiFi mode STA set a NAV during the duration, and
wherein if the NAV setting target indication bit indicates a second value, only the WiFi STA sets the NAV during the duration.

10. The NAN terminal in AP capability of claim 7,
wherein the NAV frame comprises a NAN sync beacon frame, a NAN discovery beacon frame, and a NAN service discovery frame,
wherein if the NAN frame is the NAN sync beacon frame, the duration is a time duration until the NAN terminal in AP capability transitions back to the switching mode after the NAN sync beacon frame is transmitted,
wherein if the NAN frame is the NAN discovery beacon frame, the duration is a time duration until the NAN terminal in AP capability transitions back to the switching mode after the NAN discovery beacon frame is transmitted, and
wherein if the NAN frame is the NAN service discovery frame, the duration is a time duration until the NAN terminal in AP capability transitions back to the switching mode after the NAN service discovery frame is transmitted.

* * * * *